United States Patent
Libra

(10) Patent No.: US 10,951,058 B2
(45) Date of Patent: Mar. 16, 2021

(54) SOLAR ELECTRIC HYBRID BACKUP POWER SYSTEM

(71) Applicant: William J. Libra, Arvada, CO (US)

(72) Inventor: William J. Libra, Arvada, CO (US)

(*) Notice: Subject to any disclaimer, the term of this patent is extended or adjusted under 35 U.S.C. 154(b) by 65 days.

(21) Appl. No.: 16/371,995

(22) Filed: Apr. 1, 2019

(65) Prior Publication Data

US 2019/0305588 A1    Oct. 3, 2019

Related U.S. Application Data

(60) Provisional application No. 62/651,862, filed on Apr. 3, 2018.

(51) Int. Cl.
*H02J 7/00* (2006.01)
*H02S 40/38* (2014.01)
*H02J 9/08* (2006.01)
*H02J 3/38* (2006.01)
*H02S 10/40* (2014.01)
*H02J 7/35* (2006.01)

(52) U.S. Cl.
CPC ............. *H02J 9/08* (2013.01); *H02J 3/383* (2013.01); *H02J 7/007* (2013.01); *H02J 7/0026* (2013.01); *H02J 7/0063* (2013.01); *H02J 7/35* (2013.01); *H02S 10/40* (2014.12); *H02S 40/38* (2014.12)

(58) Field of Classification Search
CPC .. H02J 9/08; H02J 3/384; H02J 7/0026; H02J 7/0063; H02J 7/007; H02J 7/35; H02S 10/40; H02S 40/38
See application file for complete search history.

(56) References Cited

U.S. PATENT DOCUMENTS

| | | | |
|---|---|---|---|
| 6,201,181 B1 | 3/2001 | Azzam et al. | |
| 6,396,239 B1 | 5/2002 | Benn et al. | |
| 6,974,904 B2 | 12/2005 | Azzam et al. | |
| 7,388,348 B2 | 6/2008 | Mattichak | |
| 7,492,120 B2 | 2/2009 | Benn et al. | |
| 7,566,991 B2* | 7/2009 | Blackman | H02J 5/00 307/65 |
| 8,120,308 B2* | 2/2012 | Ward | B60L 53/14 320/101 |
| 8,203,237 B1 | 6/2012 | Cowles | |
| 9,735,718 B2* | 8/2017 | Grafling | H02J 7/0029 |
| 9,768,632 B2* | 9/2017 | Mitri | H02J 7/1415 |

(Continued)

*Primary Examiner* — Dinh T Le
(74) *Attorney, Agent, or Firm* — Trenner Law Firm, LLC; Mark D. Trenner

(57) ABSTRACT

A device for supplying electrical power including one or more photovoltaic panels. An example device includes a primary battery electrically coupled to the photovoltaic panels. An electric motor is electrically coupled to either or both of the primary battery and the photovoltaic panels. A generator is mechanically coupled to the electric motor. A positive bus bar and negative bus bar are electrically coupled to the generator. At least one secondary battery is electrically coupled to the bus bars. At least one electrical outlet electrically coupled to the positive bus bar and negative bus bar. Electrical energy is stored in the at least one secondary battery when the supply from the generator exceeds the demand on the at least one electrical outlet. Electrical energy is discharged from the at least one secondary battery when the demand from the at least one electrical outlet exceeds the supply from the generator.

20 Claims, 5 Drawing Sheets

(56) References Cited

U.S. PATENT DOCUMENTS

| | | | | |
|---|---|---|---|---|
| 9,797,566 | B2* | 10/2017 | Souvandy | F21S 9/037 |
| 10,498,209 | B2* | 12/2019 | Shamoto | H02K 7/1004 |
| 2016/0285304 | A1 | 9/2016 | Stiefel | |
| 2017/0359010 | A1* | 12/2017 | Rozman | H02P 9/02 |

* cited by examiner

SOLAR ELECTRIC HYBRID BACKUP POWER SYSTEM

CROSS REFERENCE TO RELATED APPLICATIONS

This application claims the priority benefit of U.S. Provisional Patent Application No. 62/651,862 filed Apr. 3, 2018 for "Solar Electric Hybrid Backup Power System," hereby incorporated by reference in its entirety as though fully set forth herein.

BACKGROUND

During power failures, homes and other buildings experience a need for backup electricity. Off-grid buildings, and vehicles such as recreational vehicles (RVs), experience this need as an ongoing issue. Solar panels are not able to provide electricity when there is insufficient sunlight (e.g., at night or during cloudiness). Therefore, backup power is typically provided by gasoline or diesel generators. These generators may also be used to charge batteries, which can be used to supply DC power for lighting and automotive use, or which can be attached to an inverter to supply 110-volt AC power for household use.

DETAILED DESCRIPTION

A solar electric hybrid backup power system is disclosed. An example of the solar electric hybrid backup power system is capable of supplying backup electrical power (e.g., during electrical blackouts or brownouts). The example solar electric hybrid backup power system may also be implemented for supplying primary electrical power (e.g., to off-grid buildings, at campsites for recreational vehicles and campers, to name only a few examples).

The example solar electric hybrid backup power system may be implemented to harvest solar energy in the form of electricity, store electricity in batteries, and release stored electricity in consumer-usable formats, such as but not limited to, conventional 110 VAC and 220 VAC electrical outlets.

Within the limits of storage and retrieval efficiency, the system is capable of storing significant amounts of energy, and of delivering stored energy at significantly higher wattage than the electricity is initially collected via solar panels.

In an example, the solar electric hybrid backup power system may be attached to buildings (for example, in floodproof locations) or to vehicles such as recreational vehicles (RVs), or may be deployed at campsites.

Before continuing, it is noted that as used herein, the terms "includes" and "including" mean, but is not limited to, "includes" or "including" and "includes at least" or "including at least." The term "based on" means "based on" and "based at least in part on."

Figure 1:
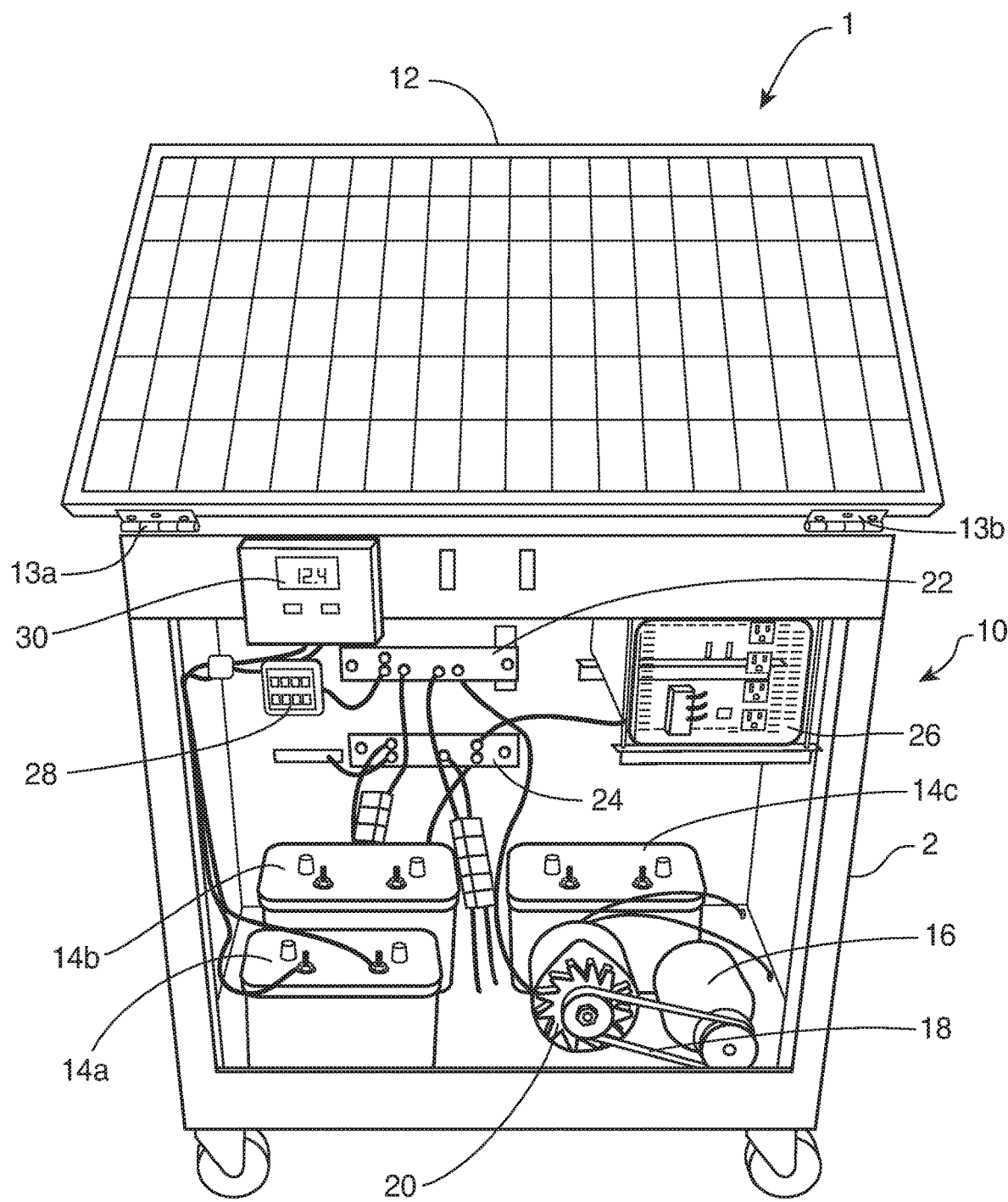
FIG. 1 is an illustration of a power system device implementing an example configuration of the solar electric hybrid power system.

FIG. 1 is an illustration of a power system device 1 implementing an example configuration of the solar electric hybrid power system 10. In an example of the solar electric hybrid backup power system 10, one or more solar panel 12 (e.g., an array of solar panels) is electrically connected to one or more deep cycle battery (DCB) 14a-c. The battery 14a-c is electrically connected to an electric motor 16. The electric motor 16 may operate a drive belt(s) 18 to turn one or more generator or alternator 20. In an example, the electric motor 16 powers multiple generators or alternators (e.g., one each in a Left and Right circuit).

The generator 20 is electrically connected to a positive bus bar 22 and a negative bus bar 24. The bus bars 22 and 24 may be connected to the DCBs (e.g., batteries 14a-b) that are configured to store electrical energy and return stored electricity to the bus bars 22 and 24 when electrical demand exceeds the electrical energy being supplied by the generator motor 18 driven by the solar panel and/or a backup battery (e.g., battery 14c).

In an example, each battery 14a-c is capable of storing 50 Amp-hours of electric charge and delivering up to 800 Amperes of peak current. It is noted that sealed, gel-type automotive batteries are leakproof and may be used in any orientation, although other types of batteries may be provided. The bus bars are also capable of providing high-Amperage DC power to an inverter 26 which provides AC power (e.g., a standard 110-volt household supply, or 220-volt supply). The inverter 26 may be electrically connected to a transformer (e.g., contained in the inverter box 26) that is configured to supply higher-voltage power (e.g., a standard 220-volt household supply, of the sort used for clothes dryers) or a step-down transformer configured to supply lower-voltage power (e.g., for charging portable electronics).

In an example, the positive and negative bus bars are attached to deep cycle batteries. The batteries are capable of storing the electrical energy when demand is low or zero, and releasing the electrical energy when demand exceeds the wattage supplied by the alternator and primary battery. The positive and negative bus bars are also connected to an inverter, which converts the 12-volt DC power to 120-volt AC power (e.g., for household use).

The positive and negative bus bars are then attached to three additional deep cycle batteries, which are capable of storing the electrical energy when demand is low or zero, and releasing the electrical energy when demand exceeds the wattage supplied by the alternator. The positive and negative bus bars are electrically connected to a four-outlet inverter. The inverter converts the 12-volt DC power of the bus bars to AC power, and in an example is capable of delivering 5,000-10,000 Watts.

The solar electric hybrid power system 10 may also include an electronics controller 30. The electronics controller 30 may include a computer controller for monitoring sensors (e.g., voltage sensors, daylight sensors, motor speed, electrical generation at the solar panel, electrical generation at the motor, etc.) and for controlling output (e.g., operating the drive motor switching between a battery storage mode and a battery output mode).

The solar electric hybrid power system 10 may also include a voltage sensing relay (e.g., operating in cooperation with the controller 30) that monitors the voltage of the bus bars and controls the voltage of the bus bars. In an example, the relay starts the motor when bus bar voltage is 11.0 volts DC, and stops the motor when the voltage reaches 12.4 volts.

The solar electric hybrid power system 10 may also include an alternator/generator (e.g., 40 amp) to reduce the size, and torque required to turn the alternator or generator, increasing run time on the solar batteries.

The solar electric hybrid power system 10 may also include an auto reset breaker 28 (e.g., 50 amp) between the bus bars and the 220 volt ac voltage inverter to handle a hard start motor which could momentarily draw more than the electrical current output (e.g., 160 amps) of the combined circuit banks.

In an example, the modules may be built into a small utility trailer, with a main electrical breaker to provide a total of 220 volts, 160 amps output. Such a configuration makes the device a viable alternative to gas generators for emergency preparedness and disaster recovery, as it can run unattended for as long as needed. Single or double (or more) modules may also be provided in recreational vehicles, small cabins, or out-buildings (e.g., for agricultural or ranch properties).

It is noted that high-Amperage DC power may present a shock and fire hazard if not properly insulated and housed, while belt-driven generators may create a pinch or ensnarement hazard. In an example, the solar electric hybrid power system may be enclosed within a housing 2 that is compliant with relevant building codes, electrical codes, vehicular codes, and/or consumer product safety standards.

It is also noted that the solar panel(s) 12 may be adjustable (e.g., via hinges 13*a-b*). As such, the solar panel(s) 12 can be oriented to increase solar energy production.

This arrangement provides a number of advantages over solar power alone, in that electrical energy can be harvested at relatively low wattage when it is available (i.e., when sunlight impinges on the solar panel), and then stored such that it can be released at significantly higher wattage when needed.

Before continuing, it should be noted that the examples described above are provided for purposes of illustration, and are not intended to be limiting. Other devices and/or device configurations may be utilized to carry out the operations described herein.

Figure 2:
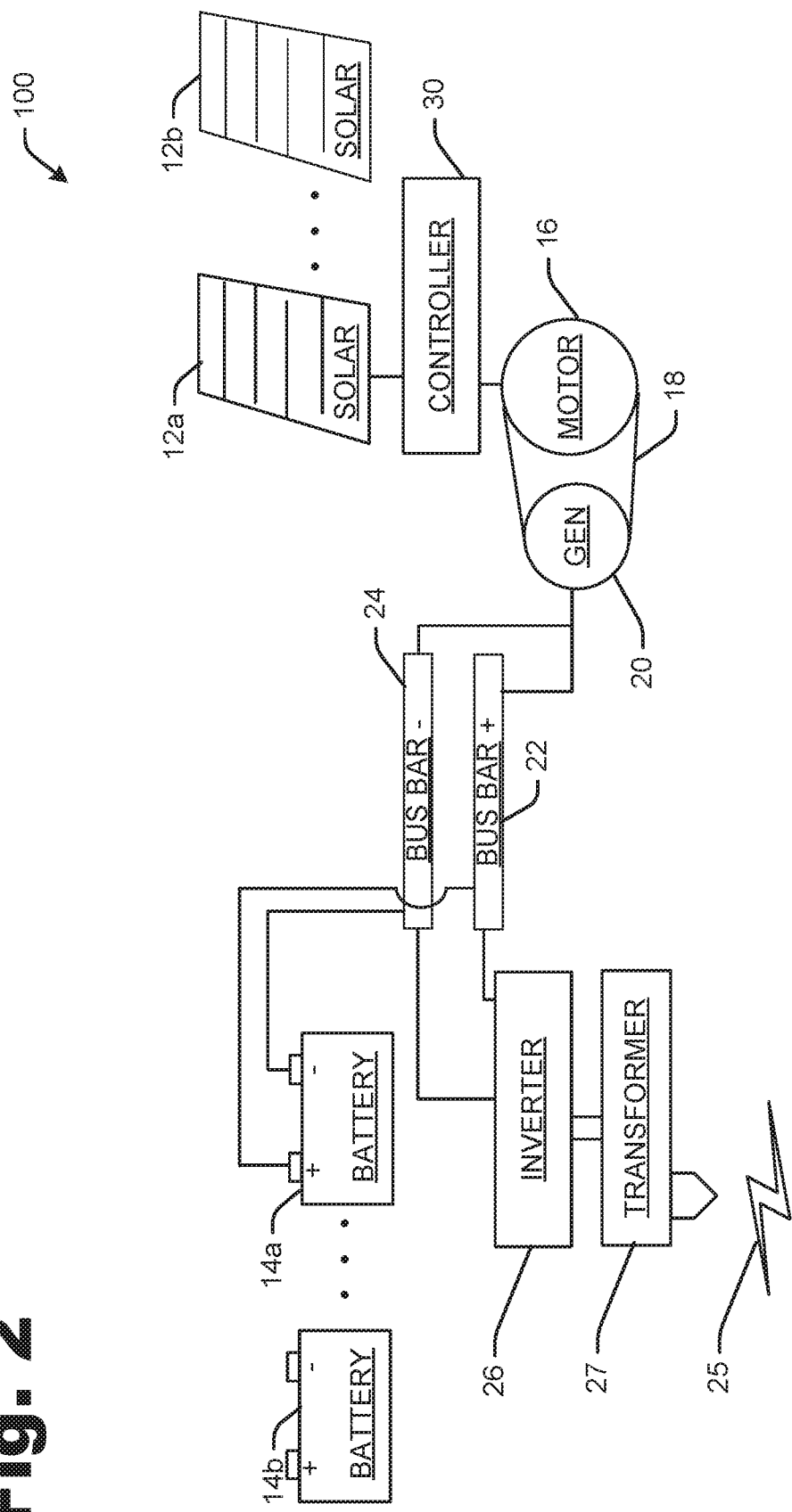
FIG. 2 is a schematic diagram of the example solar electric hybrid power system.

FIG. 2 is a schematic diagram 100 of the example solar electric hybrid power system 10. The example solar electric hybrid power system 10 includes one or more solar panel 12*a-b* electrically connected to one or more deep cycle battery (DCB) 14*a-b*. A controller 30 may be provided in this example to convert electrical energy from the solar panel(s) 12*a-b* into electrical current to power the motor 16. The electric motor 16 may operate a drive belt(s) 18 to turn one or more generator or alternator 20.

The generator 20 is electrically connected to a positive bus bar 22 and a negative bus bar 24. The bus bars 22 and 24 may be connected to the DCBs (e.g., batteries 14*a-b*) that are configured to store electrical energy and return stored electricity to the bus bars 22 and 24 when electrical demand exceeds the electrical energy being supplied by the generator motor 18 driven by the solar panel 12*a-b*. Electrical energy 25 may be delivered via inverter 26 and transformer 27 for use, e.g., to power lights and/or any other device(s) requiring electrical power.

In an example, each battery 14*a-b* is capable of storing 50 Amp-hours of electric charge and delivering up to 800 Amperes of peak current. It is noted that sealed, gel-type automotive batteries are leakproof and may be used in any orientation, although other types of batteries may be provided.

In an example, each of the solar panels 12*a-b* are capable of delivering up to 8.7 Amperes of current at 49.0 volts. The electric power is fed into a DC-to-DC converter that steps it down to 12.25 volts, with a maximum current of 34.5 Amperes.

In an example, the deep cycle batteries (DCBs) 14*a-b* are 12-volt, 55 Amp-hour batteries. The motor 16 is a 2,165 RPM motor capable of delivering 4.0 Amperes at zero load. The alternator 20 produces 12-volt DC power with a maximum peak current of 245 Amperes. The bus bars 22 and 24 provide 12-volt DC power with a maximum peak current of at least 400 Amperes. The inverter 26 is capable of supplying a peak power of 5,000-10,000 Watts.

Figure 3:
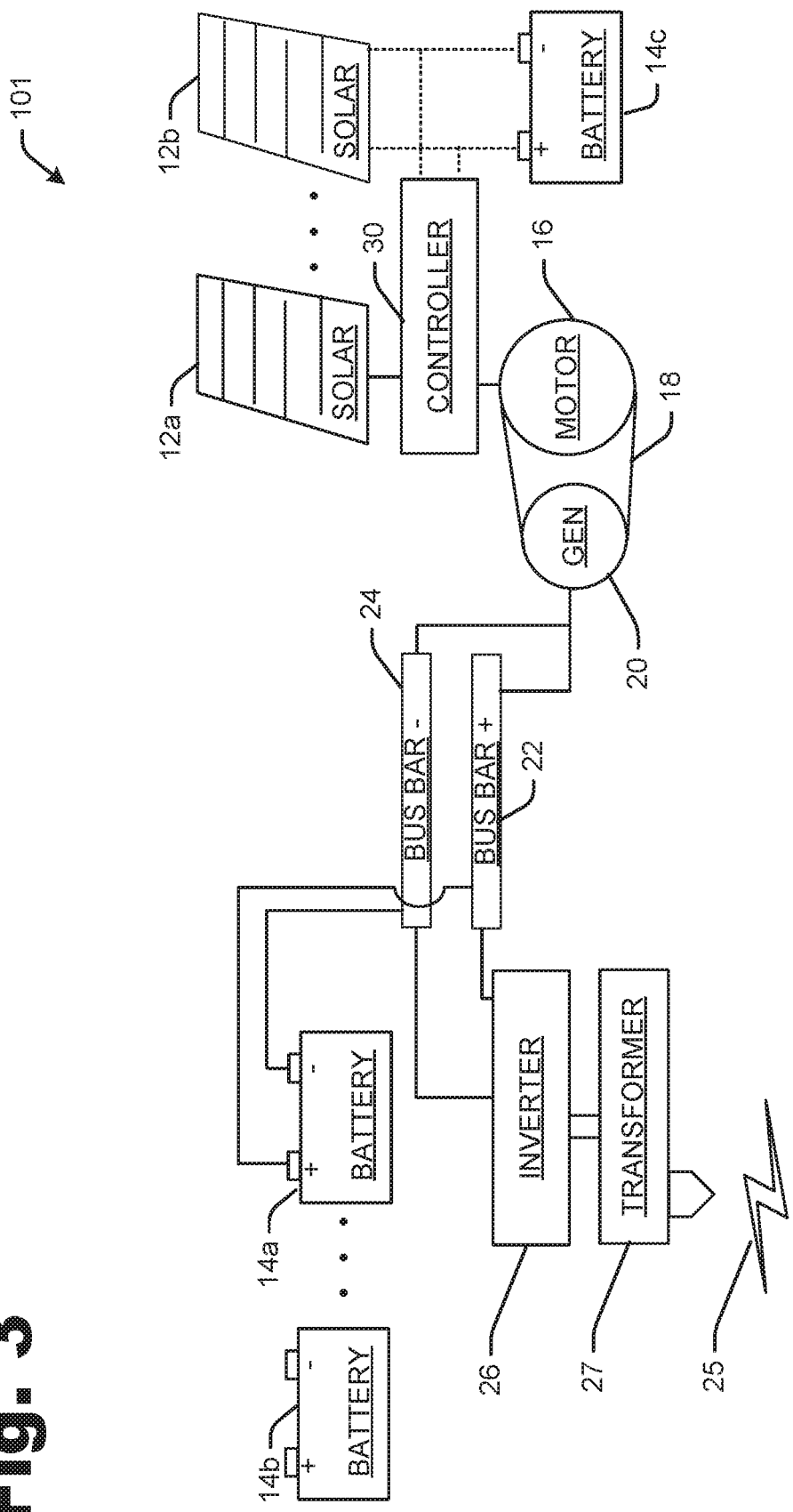
FIG. 3 is another schematic diagram of the example solar electric hybrid power system.

FIG. 3 is another schematic diagram 101 of the example solar electric hybrid power system 10. The example solar electric hybrid power system 10 includes one or more solar panel 12*a-b* electrically connected to one or more deep cycle battery (DCB) 14*a-b*. A controller 30 may be provided to convert electrical energy from the solar panel(s) 12*a-b* into electrical current to power the motor 16. The controller 30 may also be provided for other control operations, e.g., as mentioned above.

In this example, an additional battery 14*c* may be provided to aid in powering the electric motor and/or smooth power provided to the motor via the solar panel(s) 12*a-b*. The electric motor 16 may operate a drive belt(s) 18 to turn one or more generator or alternator 20.

In an example, the battery 14*c* is connected to the electric motor 16, which uses a drive belt 18 to turn the alternator 20 that generates electricity. Although not shown, the 12V output of the alternator 20 may also be connected through the positive and negative bus bars to provide additional 12V power to the motor 16. In this configuration, the majority of the power to the 12V bus comes from the battery when it is highly charged, while the majority comes from the alternator when the battery charge is low.

The generator 20 is electrically connected to a positive bus bar 22 and a negative bus bar 24. The bus bars 22 and 24 may be connected to the DCBs (e.g., batteries 14*a-b*) that are configured to store electrical energy and return stored electricity to the bus bars 22 and 24 when electrical demand exceeds the electrical energy being supplied by the generator motor 18 driven by the solar panel 12*a-b*. Electrical energy 25 may be delivered via inverter 26 and transformer 27 for use, e.g., to power lights and/or any other device(s) requiring electrical power.

Figure 4:
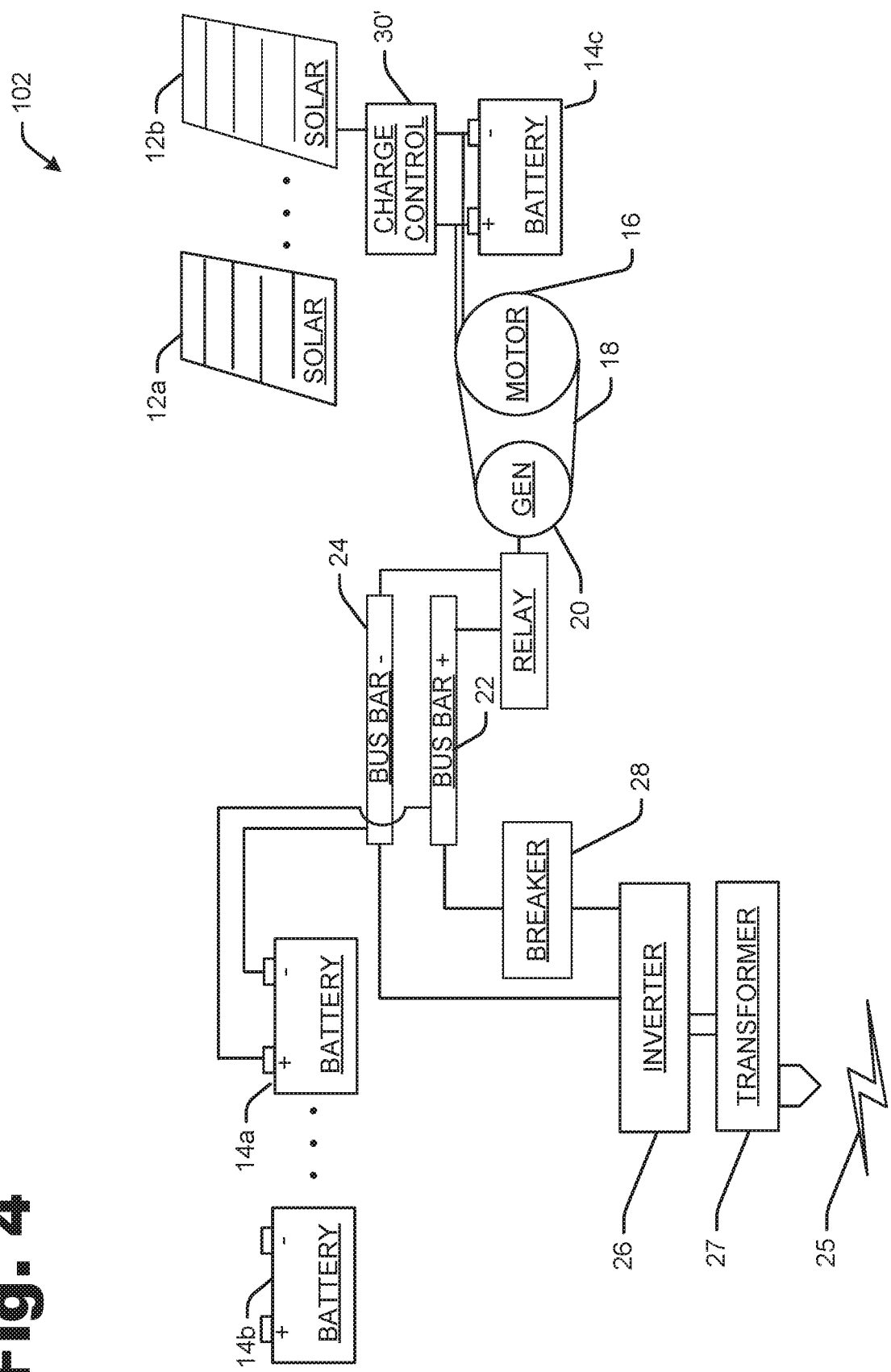
FIG. 4 is another schematic diagram of the example solar electric hybrid power system.

FIG. 4 is another schematic diagram 102 of the example solar electric hybrid power system 10. The example solar electric hybrid power system 10 includes one or more solar panel 12*a-b* electrically connected to one or more deep cycle battery (DCB) 14*a-b*. A charge controller 30' may be provided in this example to convert electrical energy from the solar panel(s) 12*a-b* into electrical current to power the motor 16. The electric motor 16 may operate a drive belt(s) 18 to turn one or more generator or alternator 20.

The generator 20 is electrically connected to a positive bus bar 22 and a negative bus bar 24. The bus bars 22 and 24 may be connected to the DCBs (e.g., batteries 14*a-b*) that are configured to store electrical energy and return stored electricity to the bus bars 22 and 24 when electrical demand exceeds the electrical energy being supplied by the generator motor 18 driven by the solar panel 12*a-b*. Electrical energy 25 may be delivered via inverter 26 and transformer 27 for use, e.g., to power lights and/or any other device(s) requiring electrical power.

Figure 5:
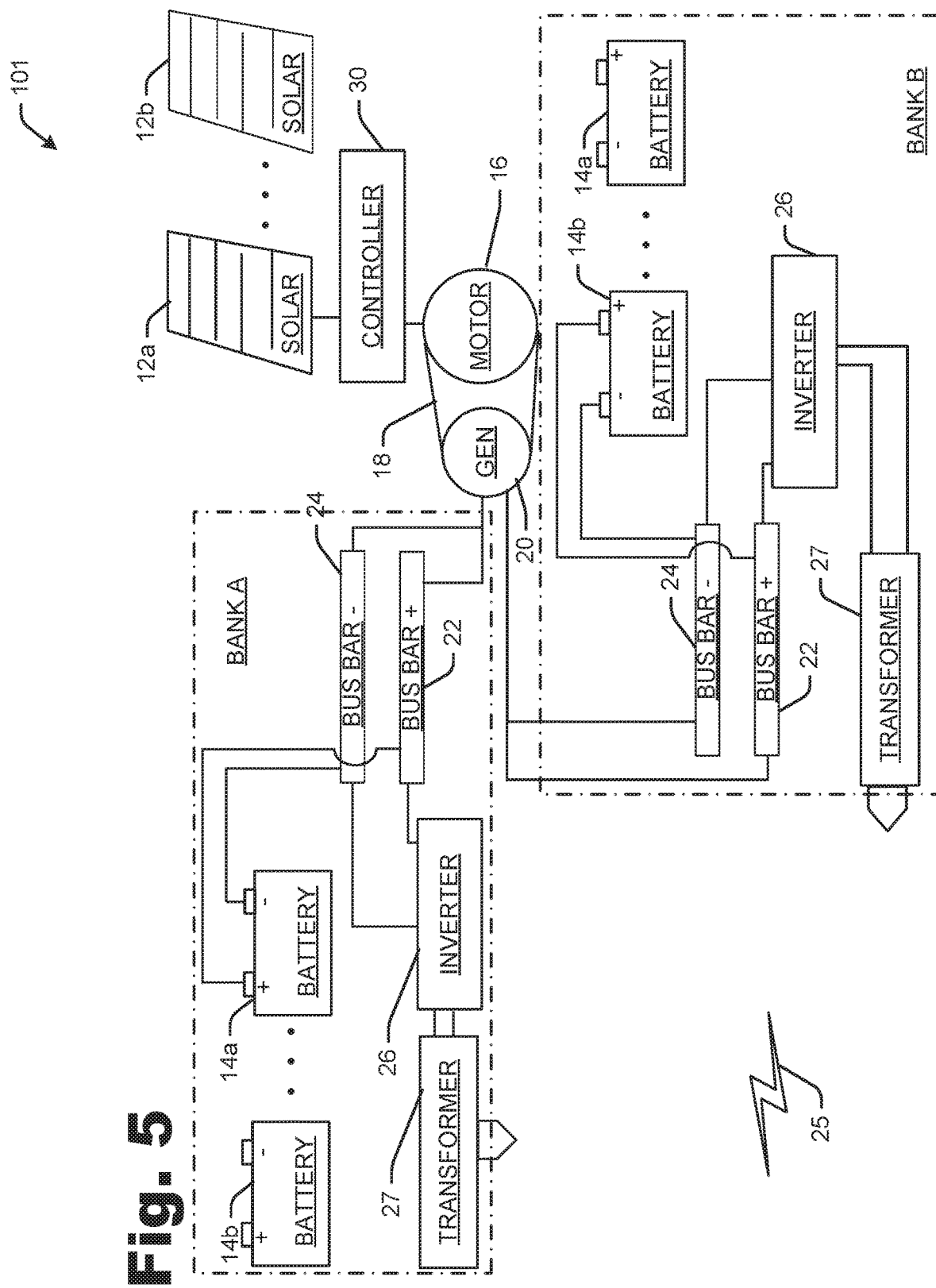
FIG. 5 is a schematic diagram of the example solar electric hybrid power system.

FIG. 5 is a schematic diagram 103 of the example solar electric hybrid power system 10. The example solar electric hybrid power system 10 includes one or more circuit banks (e.g., Bank A and Bank B). The solar panel 12a-b is electrically connected via controller 30 to convert electrical energy from the solar panel(s) 12a-b into electrical current to power the motor 16. The controller may also control other aspects, e.g., as mentioned above and/or the electric motor 16 may operate a drive belt(s) 18 to turn one or more generator or alternator 20.

The generator 20 is electrically connected to each circuit bank (Bank A and Bank B). The circuit banks have a positive bus bar 22 and a negative bus bar 24. The bus bars 22 and 24 may be connected to the DCBs (e.g., batteries 14a-b) that are configured to store electrical energy and return stored electricity to the bus bars 22 and 24 when electrical demand exceeds the electrical energy being supplied by the generator motor 18 driven by the solar panel 12a-b. Electrical energy 25 may be delivered via inverter 26 and transformer 27 for use, e.g., to power lights and/or any other device(s) requiring electrical power.

In this example, the solar panel is connected to a solar controller with an output of 12V at up to 7 A. This power charges a primary deep cycle battery (e.g., a sealed gel automotive battery), which is connected to a voltage controller that delivers 12V power to the positive and negative bus bars.

In each of the Left and Right circuits, the alternator is electrically connected to positive and negative 12V bus bars. The bus bars are electrically connected to multiple deep cycle batteries. The 12V bus bars are also electrically connected to a 4-outlet, 110-volt power inverter that is capable of providing electricity in the same format as a normal household wall outlet.

The configurations and operations shown and described herein are provided to illustrate example implementations. It is noted that the operations are not limited to the ordering shown. Still other configurations and operations may also be implemented. Different numbers of batteries, different numbers of solar panels, and different wiring arrangements may be provided that perform the desired function. Furthermore, instead of mechanical coupling between the motor and alternator or generator being via a drive belt, this coupling may be accomplished through gears, pulleys, wheels, a clutch mechanism, direct axial connection, or other mechanical methods that are known in the art.

It is noted that the examples shown and described are provided for purposes of illustration and are not intended to be limiting. Still other examples are also contemplated.

The invention claimed is:

1. A method of providing electricity, comprising:
   collecting photovoltaic energy with one or more photovoltaic panels;
   transmitting the photovoltaic energy as electricity to a primary battery;
   driving a motor with electricity stored in the primary battery and/or electricity derived directly from the photovoltaic panel;
   driving a generator with mechanical energy derived from the motor;
   conveying electrical energy from the generator to a positive and negative bus bar, such that there is a voltage between the positive and negative bus bars;
   electrically coupling a bank of secondary batteries to the bus bars such that the secondary batteries are configured to be charged and discharged through the bus bars;
   supplying the electricity stored in the primary battery and/or the electricity derived directly from the photovoltaic panel through one or more electrical outlets that are electrically coupled to the positive and negative bus bars;
   monitoring via a voltage sensing relay, a voltage of the positive and negative bus bars; and
   controlling via the voltage sensing relay, the voltage of the positive and negative bus bars.

2. The method of claim 1, further comprising providing direct current (DC) electricity through the one or more electrical outlets connected to the bus bars.

3. The method of claim 1, further comprising passing electrical energy from the positive and negative bus bars through an inverter and supplying the electrical energy as alternating current (AC) electricity through one or more standard AC electrical outlets.

4. The method of claim 1, further comprising connecting electrical energy through a voltage regulator, transformer, or DC-DC converter.

5. The method of claim 1, further comprising providing a housing that is compliant with any of building codes, electrical codes, vehicular codes, and consumer product safety standards.

6. The method of claim 1, wherein the motor and generator are mechanically coupled via a belt drive.

7. The device of claim 1, further comprising:
   starting the electric motor via the voltage sensing relay, when bus bar voltage is about 11.0 volts DC; and
   stopping the electric motor via the voltage sensing relay, when the bus bar voltage reaches about 12.4 volts.

8. A device for supplying electrical power, comprising:
   one or more photovoltaic panels;
   a primary battery electrically coupled to the one or more photovoltaic panels;
   an electric motor electrically coupled to either or both of the primary battery and the one or more photovoltaic panels;
   a generator mechanically coupled to the electric motor;
   a positive bus bar and negative bus bar electrically coupled to the generator;
   at least one secondary battery electrically coupled to the positive bus bar and negative bus bar;
   at least one electrical outlet electrically coupled to the positive bus bar and negative bus bar; and
   a voltage sensing relay that monitors voltage of the positive and negative bus bars and controls the voltage of the positive and negative bus bars;
   wherein electrical energy is stored in the at least one secondary battery when a voltage supply from the generator exceeds a voltage demand on the at least one electrical outlet; and
   wherein electrical energy is discharged from the at least one secondary battery when the demand from the at least one electrical outlet exceeds the supply from the generator.

9. The device of claim 8, wherein the one or more electrical outlets supply DC electricity.

10. The device of claim 8, further comprising an inverter electrically coupled between the positive and negative bus bars and the one or more electrical outlets, such that one or more of the electrical outlets supply AC electricity.

11. The device of claim 8, further comprising at least one of a voltage regulator, transformer, and a DC-DC converter, electrically coupled to at least one of the one or more photovoltaic cells, the positive and negative bus bars, and the one or more electrical outlets, such that voltage irregularities in the one or more electrical outlets are smoothed.

12. The device of claim 8, further comprising a housing that is compliant with any of building codes, electrical codes, vehicular codes, and consumer product safety standards.

13. The device of claim 8, wherein the motor and generator are mechanically coupled via a belt drive.

14. The device of claim 8, wherein the generator and at least one additional generator are mechanically coupled to the motor.

15. The device of claim 8, further comprising a controller to monitor at least one sensor and control operation of the motor in response to sensor input from the at least one sensor.

16. The device of claim 8, wherein the voltage sensing relay starts the motor when bus bar voltage is about 11.0 volts DC, and stops the electric motor when the bus bar voltage reaches about 12.4 volts.

17. A device for supplying electrical power, comprising:
   one or more photovoltaic panels;
   a primary battery electrically coupled to the one or more photovoltaic panels;
   an electric motor electrically coupled to either or both of the primary battery and the one or more photovoltaic panels;
   a generator mechanically coupled to the electric motor;
   a positive bus bar and negative bus bar electrically coupled to the generator;
   at least one secondary battery electrically coupled to the positive bus bar and negative bus bar;
   at least one electrical outlet electrically coupled to the positive bus bar and negative bus bar;
   a controller configured to provide electrical energy for storage in the at least one secondary battery when the supply from the generator exceeds the demand on the at least one electrical outlet, and the controller configured to discharge electrical energy from the at least one secondary battery when the demand from the at least one electrical outlet exceeds the supply from the generator; and
   a voltage sensing relay that monitors voltage of the bus bars and controls the voltage of the bus bars.

18. The device of claim 17, wherein the voltage sensing relay starts the electric motor when bus bar voltage is about 11.0 volts DC, and stops the motor when the bus bar voltage reaches about 12.4 volts.

19. The device of claim 17, further comprising an auto-reset breaker between the bus bars and an inverter.

20. The device of claim 19, wherein the auto-reset breaker is configured to handle a hard start motor.

\* \* \* \* \*